US011603006B2

(12) United States Patent
Taguchi et al.

(10) Patent No.: US 11,603,006 B2
(45) Date of Patent: *Mar. 14, 2023

(54) VEHICLE DISPATCHING SYSTEM AND VEHICLE DISPATCHING METHOD

(71) Applicant: TOYOTA JIDOSHA KABUSHIKI KAISHA, Toyota (JP)

(72) Inventors: Koji Taguchi, Sagamihara (JP); Makoto Morita, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 5 days.

This patent is subject to a terminal disclaimer.

(21) Appl. No.: 17/357,178

(22) Filed: Jun. 24, 2021

(65) Prior Publication Data

US 2021/0316628 A1   Oct. 14, 2021

Related U.S. Application Data

(63) Continuation of application No. 16/112,869, filed on Aug. 27, 2018, now Pat. No. 11,052,780.

(30) Foreign Application Priority Data

Oct. 27, 2017   (JP) .............................. JP2017-208400

(51) Int. Cl.
 *B60L 53/63* (2019.01)
 *G05D 1/02* (2020.01)
 (Continued)

(52) U.S. Cl.
 CPC ............... *B60L 53/36* (2019.02); *B60L 53/14* (2019.02); *G05D 1/0217* (2013.01);
 (Continued)

(58) Field of Classification Search
 CPC ........ B60L 53/14; B60L 53/36; G05D 1/0291
 See application file for complete search history.

(56) References Cited

U.S. PATENT DOCUMENTS 9,102,329 B2   8/2015   Fujita et al.
9,547,307 B1   1/2017   Cullinane et al.
(Continued)

FOREIGN PATENT DOCUMENTS

CN   101814760 B   8/2012
CN   105083042 A   11/2015
(Continued)

OTHER PUBLICATIONS

Marra Francesco et al "Demand profile study of battery electric vehicle under different charging options"; 8 pages (Year: 2012).
(Continued)

*Primary Examiner* — Kira Nguyen
(74) *Attorney, Agent, or Firm* — Sughrue Mion, PLLC

(57) ABSTRACT

The vehicle dispatching system accepts a dispatch request from a user, selects an autonomous vehicle matching with the dispatch request from among a plurality of autonomous vehicles, and dispatches a selected autonomous vehicle to the user. The plurality of autonomous vehicles include a plurality of battery-mounted vehicles having an in-vehicle battery capable of being charged externally as an energy source. Each of the plurality of battery-mounted vehicles performs charging at a charging station when a charging level of the in-vehicle battery decreases. The vehicle dispatching system comprises a management server including a processor for executing programs stored in memory, the management server programmed to act as a charging planning unit that changes an upper limit charging level of the in-vehicle battery when charging at the charging station according to a time slot.

14 Claims, 10 Drawing Sheets

(51) Int. Cl.
*B60L 53/36* (2019.01)
*B60L 53/14* (2019.01)
*G06Q 10/0631* (2023.01)
*G06Q 50/30* (2012.01)

(52) U.S. Cl.
CPC ....... *G05D 1/0291* (2013.01); *G06Q 10/0631* (2013.01); *G06Q 50/30* (2013.01)

(56) References Cited

U.S. PATENT DOCUMENTS

| | | | |
|---|---|---|---|
| 9,636,981 B2 | 5/2017 | Higgins | |
| 9,802,608 B2 | 10/2017 | Urano et al. | |
| 9,886,852 B2 | 2/2018 | Urano | |
| 9,908,464 B2 | 3/2018 | Caveney et al. | |
| 9,909,516 B2 | 3/2018 | Dufford | |
| 9,944,283 B2 | 4/2018 | Kindo et al. | |
| 10,037,037 B1 | 7/2018 | Nagasaka et al. | |
| 10,067,506 B2 | 9/2018 | Matsunaga et al. | |
| 10,093,320 B2 | 10/2018 | Osumi et al. | |
| 10,120,378 B2 | 11/2018 | Matsushita et al. | |
| 10,272,783 B2 | 4/2019 | McNew | |
| 10,310,508 B2 | 6/2019 | Kunisa et al. | |
| 10,310,511 B2 | 6/2019 | Urano et al. | |
| 10,317,908 B2 | 6/2019 | Gaither et al. | |
| 10,353,394 B2 | 7/2019 | Takada et al. | |
| 10,384,676 B2 | 8/2019 | Watanabe | |
| 10,384,684 B2 | 8/2019 | Sogen | |
| 10,423,161 B2 | 9/2019 | Sakima et al. | |
| 10,520,939 B2 | 12/2019 | Sato et al. | |
| 10,539,962 B2 | 1/2020 | Sogen et al. | |
| 10,545,505 B2 | 1/2020 | Sakai | |
| 10,546,499 B2 | 1/2020 | Marcoux et al. | |
| 10,576,984 B2 | 3/2020 | Kanzawa | |
| 10,579,069 B2 | 3/2020 | Dede | |
| 10,625,781 B2 | 4/2020 | Kataoka | |
| 10,640,036 B2 | 5/2020 | Watanabe et al. | |
| 10,816,972 B2 | 10/2020 | Michalakis et al. | |
| 10,816,975 B2 | 10/2020 | Gaither et al. | |
| 10,996,338 B2 | 5/2021 | Kuffner | |
| 2009/0192655 A1* | 7/2009 | Ichikawa | B60L 53/20 700/298 |
| 2009/0315512 A1* | 12/2009 | Ichikawa | B60L 50/16 320/109 |
| 2010/0076825 A1* | 3/2010 | Sato | B60L 53/665 705/14.1 |
| 2011/0202217 A1 | 8/2011 | Kempton | |
| 2012/0091969 A1 | 4/2012 | Izumi | |
| 2013/0176000 A1 | 7/2013 | Bishop | |
| 2015/0042278 A1 | 2/2015 | Leary | |
| 2015/0283912 A1 | 10/2015 | Shimizu | |
| 2015/0329003 A1 | 11/2015 | Li | |
| 2016/0001671 A1* | 1/2016 | Mori | B60L 53/65 701/22 |
| 2017/0008416 A1* | 1/2017 | Endo | B60L 53/31 |
| 2017/0129354 A1 | 5/2017 | Hadeli | |
| 2017/0132934 A1 | 5/2017 | Kentley | |
| 2017/0246962 A1 | 8/2017 | Weber | |
| 2018/0086223 A1 | 3/2018 | Lindemann | |
| 2019/0126766 A1 | 5/2019 | Taguchi et al. | |

FOREIGN PATENT DOCUMENTS

| | | |
|---|---|---|
| CN | 105788333 A | 7/2016 |
| JP | 2009-238191 A | 10/2009 |
| JP | 2012-73979 A | 4/2012 |
| JP | 2012-153277 A | 8/2012 |

OTHER PUBLICATIONS

Taguchi, Koji et al., U.S. Appl. No. 16/112,869, filed Aug. 27, 2018.

* cited by examiner

VEHICLE DISPATCHING SYSTEM AND VEHICLE DISPATCHING METHOD

CROSS-REFERENCE TO RELATED APPLICATION

This application is a continuation of U.S. application Ser. No. 16/112,869 filed Aug. 27, 2018 (allowed), which claims priority to Japanese Patent Application No. 2017-208400, filed on Oct. 27, 2017. The entire disclosures of the prior applications are considered part of the disclosure of the accompanying continuation application, and are hereby incorporated by reference.

BACKGROUND

Field

The present disclosure relates to a vehicle dispatching system and vehicle dispatching method that accepts a dispatch request from a user and dispatches an autonomous vehicle to the user.

Background Art

A vehicle dispatching system in which an autonomous vehicle, a mobile terminal of a user and a server are connected through a network are disclosed in U.S. Pat. No. 9,547,307.

Now, generally, an electric vehicle having an in-vehicle battery as an energy source is expected to be used as an autonomous vehicle for a vehicle dispatching system. However, it takes time to charge the in-vehicle battery of the electric vehicle. If a charging level when charging at a charging station is raised, a charging time becomes longer and thereby an operation rate of the autonomous vehicles goes lower. To the contrary, if the charging time is shortened, the charging level becomes lower and thereby a travelable distance of the autonomous vehicles becomes shorter.

Therefore, by merely simple use of the vehicle dispatching system, it is hard to raise the operation rate of the autonomous vehicles used for dispatching service and also prevent the battery shortage during operation.

SUMMARY

The present disclosure has been devised in view of such problems, and an object of the present disclosure is to provide a vehicle dispatching system capable of raising the operation rate of the autonomous vehicles used for dispatching service and preventing the battery shortage during operation. Another object is to provide a vehicle dispatching method capable of raising the operation rate of the autonomous vehicles used for dispatching service and preventing the battery shortage during operation.

A vehicle dispatching system according to the present disclosure is a vehicle dispatching system that accepts a dispatch request from a user, selects an autonomous vehicle matching with the dispatch request from among a plurality of autonomous vehicles, and dispatches a selected autonomous vehicle to the user. The plurality of autonomous vehicles include a plurality of battery-mounted vehicles having an in-vehicle battery capable of being charged externally as an energy source. Each of the plurality of battery-mounted vehicles performs charging at a charging station when a charging level of the in-vehicle battery decreases. The vehicle dispatching system comprises a management server including a processor for executing programs stored in memory, the management server programmed to act as a charging planning unit that changes an upper limit charging level of the in-vehicle battery when charging at the charging station according to a time slot. According to the above configuration, the vehicle dispatching system can cope with a ride distance that changes depending on a time slot, by changing the upper limit charging level of the in-vehicle battery when charging at the charging station according to the time slot. Thereby, the vehicle operation rate is raised and the battery shortage during operation is prevented.

The charging planning unit may lower the upper limit charging level in a time slot that is predicted to have a large proportion of short-distance users, and may raise the upper limit charging level in a time slot that is predicted to have a large proportion of long-distance users. By lowering the upper limit charging level in the time slot that is predicted to have a large proportion of short-distance users, the vehicle operation rate is raised. By raising the upper limit charging level in the time slot that is predicted to have a large proportion of long-distance users, traveling a long distance becomes possible.

The charging planning unit may raise the upper limit charging level of a part of the plurality of battery-mounted vehicles in the time slot that is predicted to have a large proportion of long-distance users. Thereby, even if a long-distance user appears in the time slot that is predicted to have a large proportion of short-distance users, a battery-mounted vehicle charged with a high upper limit charging level can be dispatched to the long-distance user.

The management server may be programmed to further act as a dispatching planning unit. The dispatching planning unit dispatches a battery-mounted vehicle charged with a low upper limit charging level preferentially to a short-distance user, and dispatches a battery-mounted vehicle charged with a high upper limit charging level to a long-distance user, in the time slot that is predicted to have a large proportion of short-distance users, when ride distance information is included in the dispatch request. Thereby, when a user gives a dispatch request including information about his/her ride distance (e.g., getting-on place and destination) to the vehicle dispatching system, the vehicle dispatching system can dispatch a vehicle matching with both a demand from the company side to want to raise the vehicle operation rate and a demand from the user side about the ride distance, from among battery-mounted vehicles charged with a high upper limit charging level and battery-mounted vehicles charged with a low upper limit charging level.

In the above case, the dispatching planning unit may dispatch a battery-mounted vehicle charged with a low upper limit charging level in the time slot that is predicted to have a large proportion of short-distance users, when the ride distance information is not included in the dispatch request. This makes it unnecessary to prepare a lot of battery-mounted vehicles charged with a high upper limit charging level, and makes it possible to maintain the vehicle operation rate highly.

The plurality of battery-mounted vehicles used in the vehicle dispatching system according to the present disclosure may be electric vehicles having the in-vehicle battery as an only energy source, that is, pure electric vehicles. Also, the plurality of battery-mounted vehicles used in the vehicle dispatching system according to the present disclosure may be plug-in hybrid vehicles having the in-vehicle battery and an energy source other than the in-vehicle battery. In the present specification, an electric vehicle means a pure electric vehicle, and a term "battery-mounted vehicle" is used as a generic concept including "electric vehicle" and "plug-in hybrid vehicle".

The plurality of battery-mounted vehicles used in the vehicle dispatching system according to the present disclosure may include electric vehicles and plug-in hybrid vehicles. That is, the battery-mounted vehicles used for dispatching service may be organized to include both electric vehicles and plug-in hybrid vehicles. In this case, for example, following embodiments may be adopted with reference to dispatching plan.

According to one embodiment, the dispatching planning unit dispatches an electric vehicle preferentially to a short-distance user, and dispatches a plug-in hybrid vehicle to a long-distance user, in the time slot that is predicted to have a large proportion of short-distance users, when ride distance information is included in the dispatch request. Thereby, when a user gives a dispatch request including information about his/her ride distance (e.g., getting-on place and destination) to the vehicle dispatching system, the vehicle dispatching system can dispatch a vehicle matching with both a demand from the company side to want to suppress the energy cost and a demand from the user side about the ride distance, from among electric vehicles and plug-in hybrid vehicles.

In the above case, the dispatching planning unit may dispatch an electric vehicle in the time slot that is predicted to have a large proportion of short-distance users, when the ride distance information is not included in the dispatch request. This makes it unnecessary to prepare a lot of plug-in hybrid vehicles, and makes it possible to suppress the energy cost.

According to another embodiment, the dispatching planning unit dispatches an electric vehicle charged with a low upper limit charging level preferentially to a short-distance user, and dispatches an electric vehicle charged with a high upper limit charging level or a plug-in hybrid vehicle to a long-distance user, in the time slot that is predicted to have a large proportion of short-distance users, when ride distance information is included in the dispatch request. Thereby, when a user gives a dispatch request including information about his/her ride distance (e.g., getting-on place and destination) to the vehicle dispatching system, the vehicle dispatching system can dispatch a vehicle matching with both a demand from the company side to want to raise the vehicle operation rate and suppress the energy cost and a demand from the user side about the ride distance, from among electric vehicles and plug-in hybrid vehicles.

In the above case, the dispatching planning unit may dispatch an electric vehicle charged with a high upper limit charging level preferentially to a long-distance user when a ride distance of the user is shorter than a travelable distance by the in-vehicle battery, and may dispatch a plug-in hybrid vehicle to the long-distance user when the ride distance of the user is longer than the travelable distance by the in-vehicle battery. According to this dispatching plan, an electric vehicle is used more preferentially than a plug-in hybrid vehicle. This makes it unnecessary to prepare a lot of plug-in hybrid vehicles, and makes it possible to raise the vehicle operation rate and suppress the energy cost.

Also, in the above case, the dispatching planning unit may dispatch an electric vehicle charged with a low upper limit charging level in the time slot that is predicted to have a large proportion of short-distance users, when the ride distance information is not included in the dispatch request. This makes it unnecessary to prepare a lot of electric vehicles charged with a high upper limit charging level, and also makes it unnecessary to prepare a lot of plug-in hybrid vehicles. Accordingly, it is possible to raise the vehicle operation rate and suppress the energy cost.

The vehicle dispatching system according to the present disclosure may designate a charging method at the charging station to the battery-mounted vehicles. For example, the vehicle dispatching system usually directs the battery-mounted vehicles to perform normal charging at the charging station, and, when the number of available battery-mounted vehicles is predicted to become insufficient due to increase in dispatch demand, directs the battery-mounted vehicles to perform quick charging at the charging station. Thereby, deterioration of the in-vehicle battery by the quick charging is prevented usually, and shortage of available vehicles is prevented by permitting the quick charging when dispatch demand is increased.

Also, the vehicle dispatching system may usually direct the battery-mounted vehicles to perform normal charging at the charging station, and, when a battery-mounted vehicle carrying a user seems not to be able to travel a necessary distance due to the battery shortage, may move the battery-mounted vehicle carrying a user to the charging station and direct the battery-mounted vehicle carrying a user to perform quick charging. Thereby, deterioration of the in-vehicle battery by the quick charging is prevented usually, and occurrence of a situation where the battery-mounted vehicle carrying a user becomes unable to travel due to the battery shortage is prevented by permitting the quick charging in case of emergency.

A vehicle dispatching method according to the present disclosure is a vehicle dispatching method that accepts a dispatch request from a user, selects an autonomous vehicle matching with the dispatch request from among a plurality of autonomous vehicles, and dispatches a selected autonomous vehicle to the user. The vehicle dispatching method comprises: preparing, as a part of the plurality of autonomous vehicles, a plurality of battery-mounted vehicles having an in-vehicle battery capable of being charged externally as an energy source; performing charging with respect to each of the plurality of battery-mounted vehicles at a charging station when a charging level of the in-vehicle battery decreases; and changing an upper limit charging level of the in-vehicle battery when charging at the charging station according to a time slot. According to the vehicle dispatching method as above, it is possible to cope with the ride distance that changes depending on a time slot, by changing the upper limit charging level of the in-vehicle battery when charging at the charging station according to the time slot. Thereby, the vehicle operation rate is raised and the battery shortage during operation is prevented.

According to the vehicle dispatching method according to the present disclosure, the upper limit charging level may be lowered in a time slot that is predicted to have a large proportion of short-distance users, and may be raised in a time slot that is predicted to have a large proportion of long-distance users. By lowering the upper limit charging level in the time slot that is predicted to have a large proportion of short-distance users, the vehicle operation rate is raised. By raising the upper limit charging level in the time slot that is predicted to have a large proportion of long-distance users, traveling a long distance becomes possible.

According to the vehicle dispatching method according to the present disclosure, the upper limit charging level of a part of the plurality of battery-mounted vehicles may be raised in the time slot that is predicted to have a large proportion of long-distance users. Thereby, even if a long-distance user appears in the time slot that is predicted to have a large proportion of short-distance users, a battery-mounted vehicle charged with a high upper limit charging level can be dispatched to the long-distance user.

As described above, according to the vehicle dispatching system and the vehicle dispatching method according to the present disclosure, the upper limit charging level of the in-vehicle battery when charging at the charging station is changed according to a time slot so as to operate the battery-mounted vehicles with charging level appropriate to the ride distance that users require. Thereby, the vehicle operation rate is raised and the battery shortage during operation is prevented.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly specified by the numerals theoretically. Furthermore, structures that are described in the embodiments shown as follows are not always indispensable to the disclosure unless specially explicitly shown otherwise, or unless the disclosure is explicitly specified by the structures theoretically.

1. First Embodiment 1-1. Configuration of Vehicle Dispatching System

Figure 1:
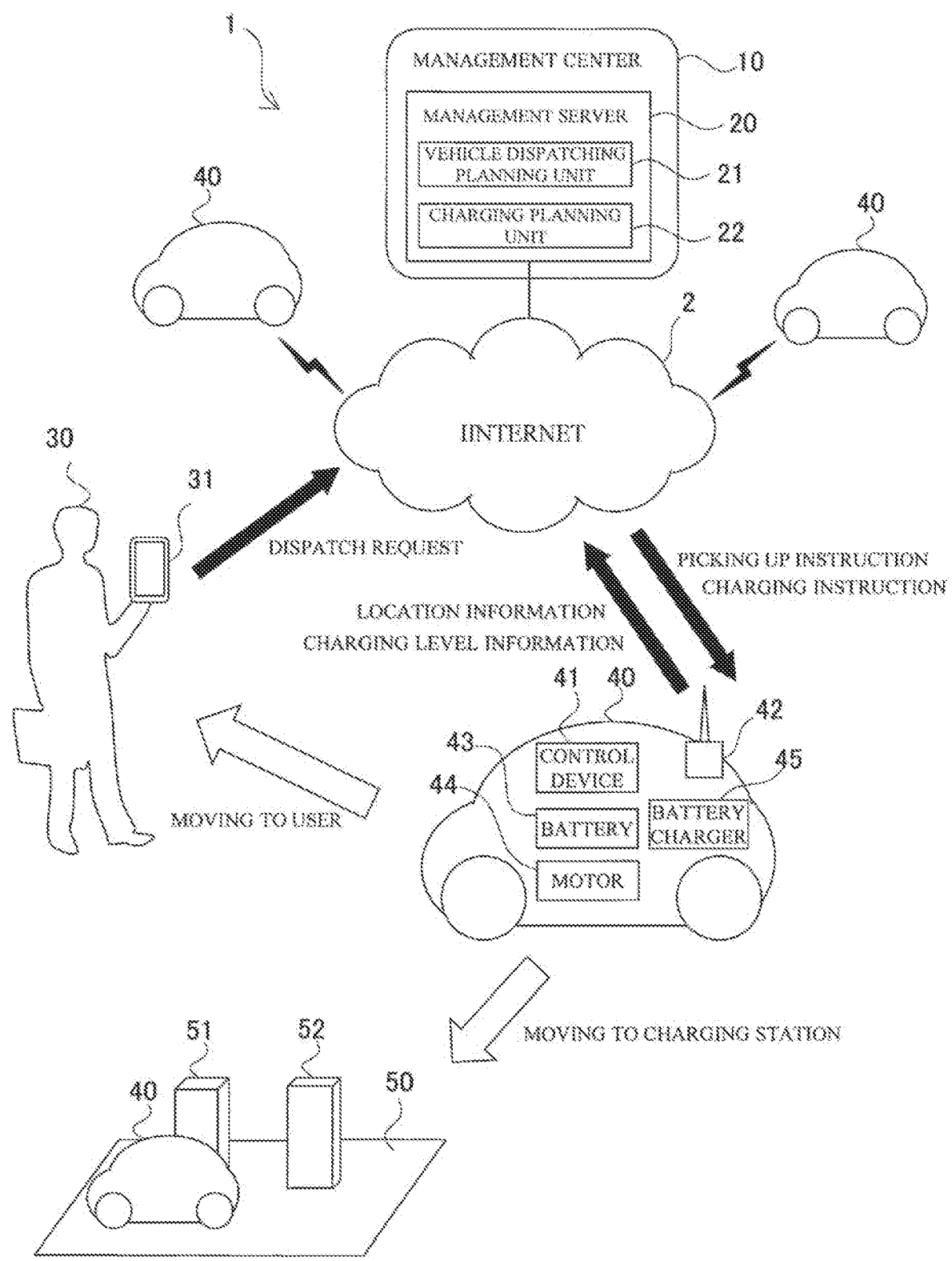
FIG. 1 is a view illustrating a configuration of a vehicle dispatching system according to embodiments of the present disclosure.

A vehicle dispatching system is a system to implement dispatching service of dispatching an autonomous vehicle to a user in accordance with a demand from the user. FIG. 1 is a view illustrating a configuration of the vehicle dispatching system 1 according to the embodiments of the present disclosure. The configuration of the vehicle dispatching system 1 will be described with reference to FIG. 1 as follows. Note that the configuration of the vehicle dispatching system 1 described herein is the configuration common to the second to sixth embodiments described below as well as the first embodiment.

The vehicle dispatching system 1 comprises a vehicle 40, a mobile terminal 31 that a user 30 in the vehicle dispatching system 1 possesses, and a management center 10 communicating with the vehicle 40 and the mobile terminal 31 through a network (i.e., the Internet) 2. The number of vehicles 40 constituting the vehicle dispatching system 1 is at least two. More specifically, at least two vehicles 40 belong to the vehicle dispatching system 1 operably.

The vehicle 40 used in the vehicle dispatching system 1 is a battery-mounted vehicle that has an in-vehicle battery 43 capable of being charged externally as an energy source. There are two kinds of battery-mounted vehicles. The one is an electric vehicle that has only a battery 43 as an energy source. The other is a plug-in hybrid vehicle that has a battery 43 and an energy source other than the battery 43. The vehicle 40 used in the vehicle dispatching system 1 may be either an electric vehicle or a plug-in hybrid vehicle. The vehicle 40 comprises a motor 44 as a power unit and supplies electric power from the battery 43 to the motor 44. A battery charger 45 to charge electric power to the battery 43 is installed in the vehicle 40. Note that the battery 43 may be at least a chargeable battery, but it is preferably a lithium ion battery.

Charging the battery 43 can be conducted at a charging station 50. The charging station 50 has a normal charging equipment 51 to perform normal charging and a quick charging equipment 52 to perform quick charging of which the charging speed is faster than the normal charging. However, the quick charging equipment 52 is not necessarily provided at all charging stations 50. A battery charger 45 equipped in the vehicle 40 supports both charging methods of the normal charging and the quick charging. However, the normal charging using the normal charging equipment 51 is usually chosen as a charging method for the vehicle 40 from the viewpoint of protection of the battery 43.

The vehicle 40 is an autonomous vehicle that can travel autonomously through a root from the present location to a destination based on various information. The various information for autonomous travel includes external situation recognition information to recognize situations outside the own vehicle acquired by autonomous sensors (not shown) such as a camera sensor, a LIDAR, a millimeter wave radar and the like. Also, the various information for autonomous travel includes vehicle state recognition information to recognize conditions of the own vehicle acquired by vehicle sensors (not shown) such as a vehicle speed sensor, an acceleration sensor and the like. Furthermore, the various information for autonomous travel includes location information indicating the position of the own vehicle acquired by a GPS receiver (not shown) and map information that is contained in a map database.

The vehicle 40 comprises a control device 41 and a communication device 42. The control device 41 is an ECU (Electronic Control Unit) having at least one processor and at least one memory. At least one program for autonomous travel and various data are stored in the memory. When a program stored in the memory is read out and executed by the processor, various functions for autonomous travel are achieved by the control device 41. Note that the control device may comprise a plurality of ECUs.

The control device 41 calculates a travel root along which the own vehicle travels based on the location information of the own vehicle and the map information, and controls driving, steering, and braking of the own vehicle to make the own vehicle travel along the calculated travel route. There are various well-known methods for autonomous travel methods, and autonomous travel methods themselves are not limited in the present disclosure at all, so that the details of autonomous travel method will be omitted. The control device 41 performs autonomous traveling to a getting-on place specified by the user 30, picking up processing to pick the user 30 up at the getting-on place, autonomous traveling to the destination specified by the user 30, dropping processing to drop the user 30 off at the destination, autonomous traveling to the charging station 50, automatic charging at the charging station 50 and the like.

The control device 41 is configured to be connected to the network 2 using the communication device 42. The communication standard of the radio communication used by the communication device 42 may be a standard of mobile communication such as 4G, LTE, 5G and the like. The control device 41 is connected to the management center 10 through the network 2. The control device 41 controls operation of the vehicle 40 based on decisions based on the information obtained from the autonomous sensors and the vehicle sensors and instructions from the management center 10.

The mobile terminal 31 is a wireless communication terminal that is available for radio communication between a base station (not shown) of the network 2, for example, a smartphone. The communication standard of the radio communication used by the mobile terminal 31 may be a standard of mobile communication such as 4G, LTE, 5G and the like. An application for using the vehicle dispatching service is installed in the mobile terminal 31. By running the application, the mobile terminal 31 connects to the management center 10 through the network 2, and becomes able to request the management center 10 to dispatch the vehicle 40.

The management center 10 is a facility run by a company providing the vehicle dispatching service. However, it does not matter whether the management center 10 is unmanned or manned. The management center 10 may be provided with at least a management server 20. Alternatively, the management server 20 itself may be the management center 10. The management server 20 is connected to the network 2. The management server 20 is configured to communicate with the vehicle 40 and the mobile terminal 31 of the user 30 through the network 2.

The management server 20 receives a dispatch request sent through the network 2 from the mobile terminal 31 of the user 30. The dispatch request includes, for example, a getting-on place desired by the user 30 and ID information of the user 30. The dispatch request includes a destination specified by the user 30 too, but it is not necessarily essential. The management server 20 receives, for example, the location information and charging amount information of the vehicle 40 from the control device 41 in the vehicle 40. A picking up instruction to direct the vehicle 40 to move to the user 30 is transmitted from the management server 20 to the control device 41 in the vehicle 40. The picking up instruction includes information such as the ID information of the user 30, the getting-on place desired by the user 30 and the destination specified by the user 30. The ID information is used for person authentication between the vehicle 40 and the user 30. Also, a charging instruction to direct the vehicle 40 to move to the charging station 50 is transmitted from the management server 20 to the control device 41 in the vehicle 40. The charge instruction includes information such as the location of the charging station 50, the upper limit charging level of the battery 43 and the charging method.

The management server 20 is a computer having at least one processor and at least one memory. At least one program for the vehicle dispatching service and various data are stored in the memory. When a program stored in the memory is read out and executed by the processor, various functions are achieved by the management server 40. The functions achieved by the management server 20 include a function as a vehicle dispatching planning unit 21 and a function as a charging planning unit 22. The vehicle dispatching planning unit 21 plans dispatching of the vehicle 40 to the user 30. For example, the vehicle dispatching planning unit 21 dispatches the most suitable vehicle of a plurality of available vehicles 40, e.g., a vehicle that can arrive at the getting-on place desired by the user 30 earliest. The charging planning unit 22 changes the upper limit charging level when the vehicle 40 charges the battery 43 at the charging station 50 according to a time slot. Note that the management server 20 may comprise a plurality of computers.

1-2. Characteristic Configuration of the First Embodiment

The charging planning unit 22 in the management server 20 instructs the battery charger 45 in the vehicle 40 on the upper limit charging level by communication through the network 2. The charging planning unit 22 changes the upper limit charging level instructed to the battery charger 45 according to a time slot. It is statistically proved that a ride distance when the user 30 uses the vehicle dispatching service changes according to a time slot. Thus, by changing the upper limit charging level of the battery 43 when charging at the charging station 50 according to a time slot, it becomes possible to cope with the ride distance that changes depending on the time slot. Thereby, the vehicle operation rate of the vehicle 40 is raised and the battery shortage during operation is prevented.

Figure 2:
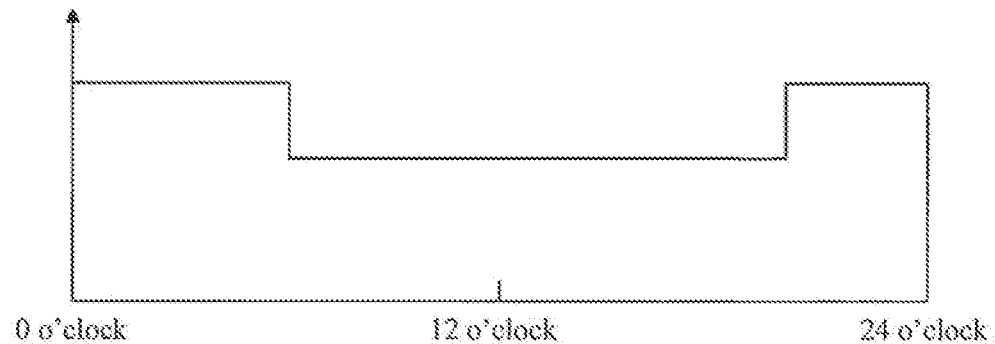
FIG. 2 is a diagram showing an example of a charging plan according to a first embodiment.

In the first embodiment, the charging planning unit 22 lowers the upper limit charging level in a time slot that is predicted to have a large proportion of short-distance users, and raises the upper limit charging level in a time slot that is predicted to have a large proportion of long-distance users. For example, as shown in FIG. 2, the upper limit charging level is set low in a daytime time slot where there are many business visitors. By lowering the upper limit charging level in the time slot that is predicted to have a large proportion of short-distance users, the vehicle operation rate is raised. On the other hand, for example, as shown in FIG. 2, the upper limit charging level is set high in a night and early-morning time slot where there are many return visitors before the first train or after the last train. By raising the upper limit charging level in the time slot that is predicted to have a large proportion of long-distance users, traveling a long distance becomes possible.

Figure 3:
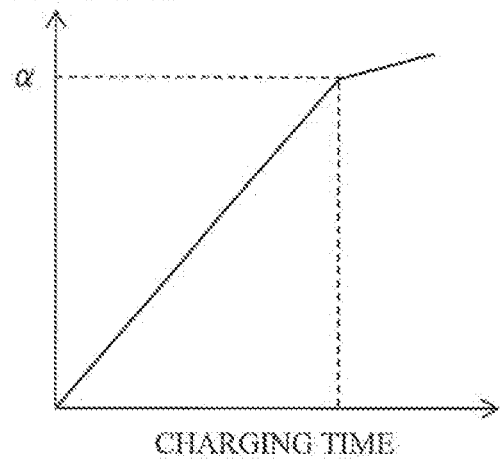
FIG. 3 is a diagram showing a relation between a charging level and a charging time.

Here, a relation between charging level and a charging time is shown in FIG. 3. The charging level increases in proportion to the charging time. However, according to characteristics of the battery 43, it is necessary to lower a charging current when charged state of the battery 43 gets closer to full charge. Thus, a charging speed will decrease when the charging level exceeds a threshold (a in FIG. 3). In the first embodiment, in the time slot that is predicted to have a large proportion of long-distance users, the upper limit charging level is set to a value that is bigger than the threshold a in order to bring the battery 43 close to full charge and to enable the vehicle travel as long as possible. In the time slot that is predicted to have a large proportion of short-distance users, the upper limit charging level is set to a value that is smaller than the threshold a in order to shorten the charging time and to raise the vehicle operation rate.

The battery 43, particularly a lithium-ion battery has characteristics that deterioration becomes large when it is left at high charging level. Therefore, avoiding a condition close to full charge as much as possible is desirable to prevent deterioration of the battery 43. According to the first embodiment, the upper limit charging level is changed according to a time slot so that the charging level is raised in only some time slots and is lowered positively in remaining time slots. This prevents deterioration of the battery 43 due to being left at high charging level.

2. Second Embodiment

The second embodiment is characterized by a charging plan made by the charging planning unit 22. In the second embodiment, basically as well as the first embodiment, the upper limit charging level is lowered in a time slot that is predicted to have a large proportion of short-distance users, and is raised in a time slot that is predicted to have a large proportion of long-distance users. However, in the second embodiment, exceptional setting is made to a part of the vehicles 40.

Figure 4:
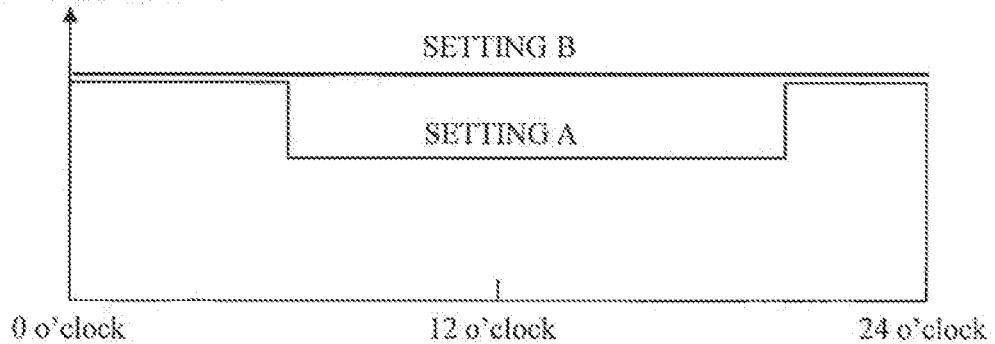
FIG. 4 is a diagram showing an example of a charging plan according to a second embodiment.

Specifically, the charging planning unit 22 raises the upper limit charging level instructed to the battery charger 45 in a part of the vehicles 40 in the time slot that is predicted to have a large proportion of short-distance users. For example, as shown in FIG. 4, two kinds of settings A and B are provided. According to the setting A, the upper limit charging level is set low in a daytime time slot, and is set high in a night and early-morning time slot. According to the setting B, the upper limit charging level is set high all day. The upper limit charging level according to the setting A is instructed to a majority of the vehicles 40. The upper limit charging level according to the setting B is instructed to a minority of the vehicles 40. Thereby, even if a long-distance user appears in the time slot that is predicted to have a large proportion of short-distance users, the vehicle 40 charged with a high upper limit charging level can be dispatched to the long-distance user.

Figure 5:
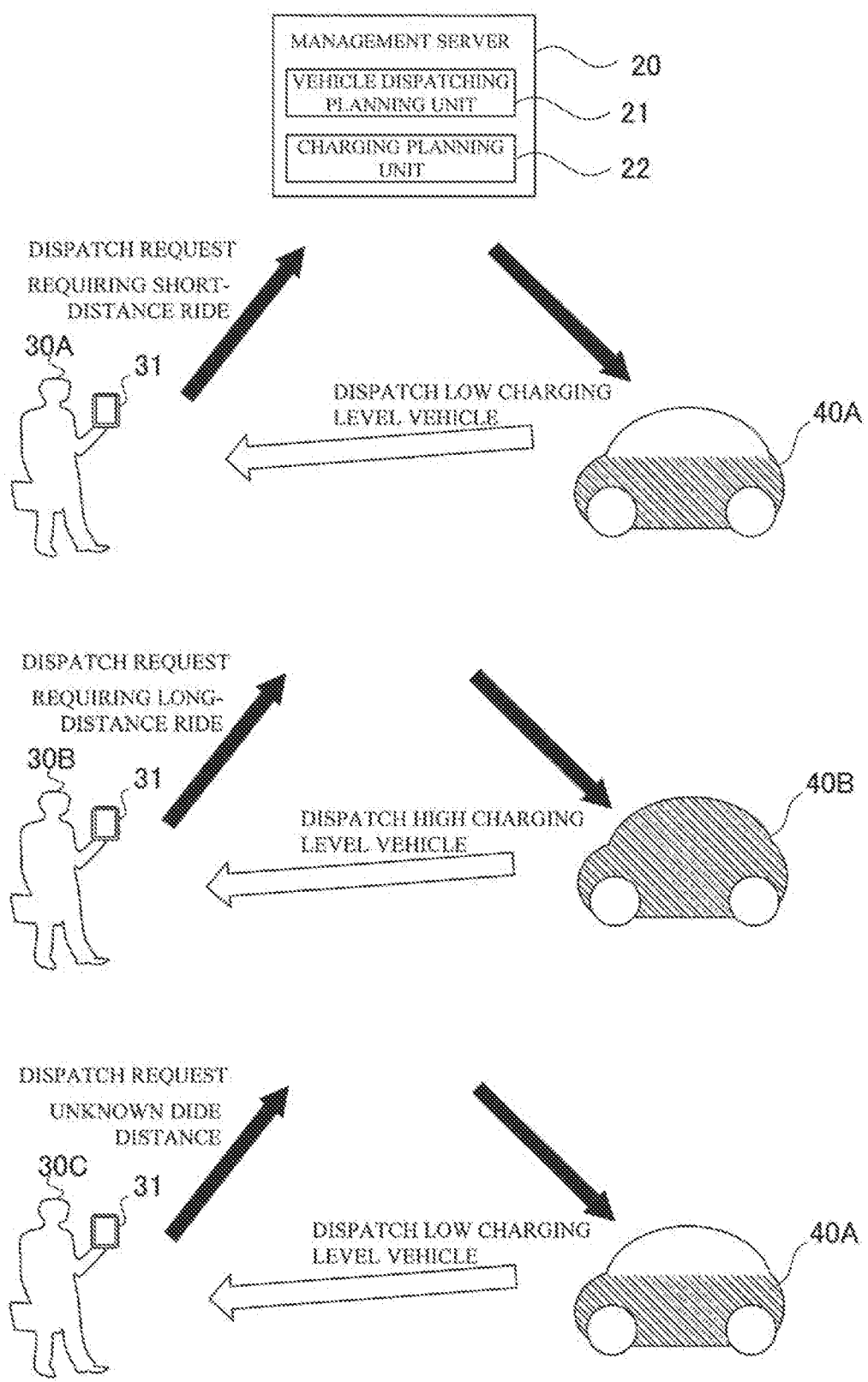
FIG. 5 is a view showing an overview of a dispatching plan according to the second embodiment.

In the second embodiment, a dispatching plan to make use of the above described charging plan is made by the vehicle dispatching planning unit 21. FIG. 5 is a view showing an overview of the dispatching plan according to the second embodiment. In a time slot that is predicted to have a large proportion of short-distance users, the charging planning unit 22 prepares a vehicle 40A charged with a low upper limit charging level and a vehicle 40B charged with a high upper limit charging level. Hereinafter, the vehicle 40A charged with a low upper limit is referred to as "low charging level vehicle 40A", and the vehicle 40B charged with a high upper limit is referred to as "high charging level vehicle 40B". In FIG. 5, the low charging level vehicle 40A is a vehicle 40 charged according to the setting A, and the high charging level vehicle 40B is a vehicle 40 charged according to the setting B. Note that an area of the oblique line portion of each vehicle 40A, 40B in FIG. 5 expresses the charging level.

The vehicle dispatching planning unit 21 selects a vehicle to be dispatched from among the vehicles 40A, 40B according to the ride distance that a user 30A, 30B requires in a time slot that is predicted to have a large proportion of short-distance users. In FIG. 5, the user 30A is a user 30 requiring a short-distance ride, and the user 30B is a user 30 requiring a long-distance ride. If the dispatch request transmitted from the mobile terminal 31 includes a getting-on place and a destination, the ride distance required by the user 30A, 30B is obtained by calculating the distance from the getting-on place to the destination. Alternatively, a system may be adopted that the user 30A, 30B selects an approximate ride distance from among choices when transmitting the dispatch request.

The vehicle dispatching planning unit 21 compares a predetermined reference distance with the ride distance required by the user 30A, 30B. The vehicle dispatching planning unit 21 dispatches the low charging level vehicle 40A preferentially to the user 30A who requires a ride distance shorter than the reference distance, and dispatches the high charging level vehicle 40B to the user 30B who requires a ride distance equal to or longer than the reference distance. According to such a vehicle dispatching plan, a vehicle is dispatched that matches with both a demand from the company side to want to raise the vehicle operation rate and a demand from the user 30A, 30B side about the ride distance.

Note that the number of low charging level vehicles 40A may be insufficient with respect to the number of the dispatch requests requiring a short-distance ride. In such a case, the vehicle dispatching planning unit 21 dispatches the high charging level vehicle 40B to a user requiring a relatively long ride distance. On the contrary, the vehicle dispatching planning unit 21 dispatches the low charging level vehicle 40A to a user requiring a relatively short-distance ride when the number of high charging level vehicles 40B is insufficient with respect to the number of the dispatch requests requiring a long-distance ride.

If a destination is not always necessary to be designated when making the dispatch request, information about a ride distance required by a user may not be obtained from the dispatch request transmitted from the mobile terminal 31. The vehicle dispatching planning unit 21 dispatches the low charging level vehicle 40A to a user 30C of whom the dispatching request is unknown on a ride distance. The probability that a long-distance ride is required is low in a time slot that is predicted to have a large proportion of short-distance users. Even if there exists a user who requires a long-distance ride, it may be notified to the user that charging may become necessary on the way, and the consent may be obtained from the user. According to such a use of the vehicle dispatching plan, it is unnecessary to prepare a lot of high charging level vehicles 40B, and makes it possible to maintain the vehicle operation rate highly.

However, when the ride distance that the user 30C requires is unknown from the dispatch request, past usage history of the user 30C may be used as the information about the ride distance. By constructing a database that connects the usage history with the ID information of the user 30C in the management server 20, the usage history can be retrieved from the database using the ID information. For example, when the user 30C has continuously used this service for long-distance movement, this dispatch request is estimated to be one that requires a long-distance ride. In this case, the high charging level vehicle 40B may be dispatched instead of the low charging level vehicle 40A. When not being able to get a tendency of the ride distance of the user 30C from the usage history, the low charging level vehicle 40A may be dispatched according to a principle.

Figure 6:
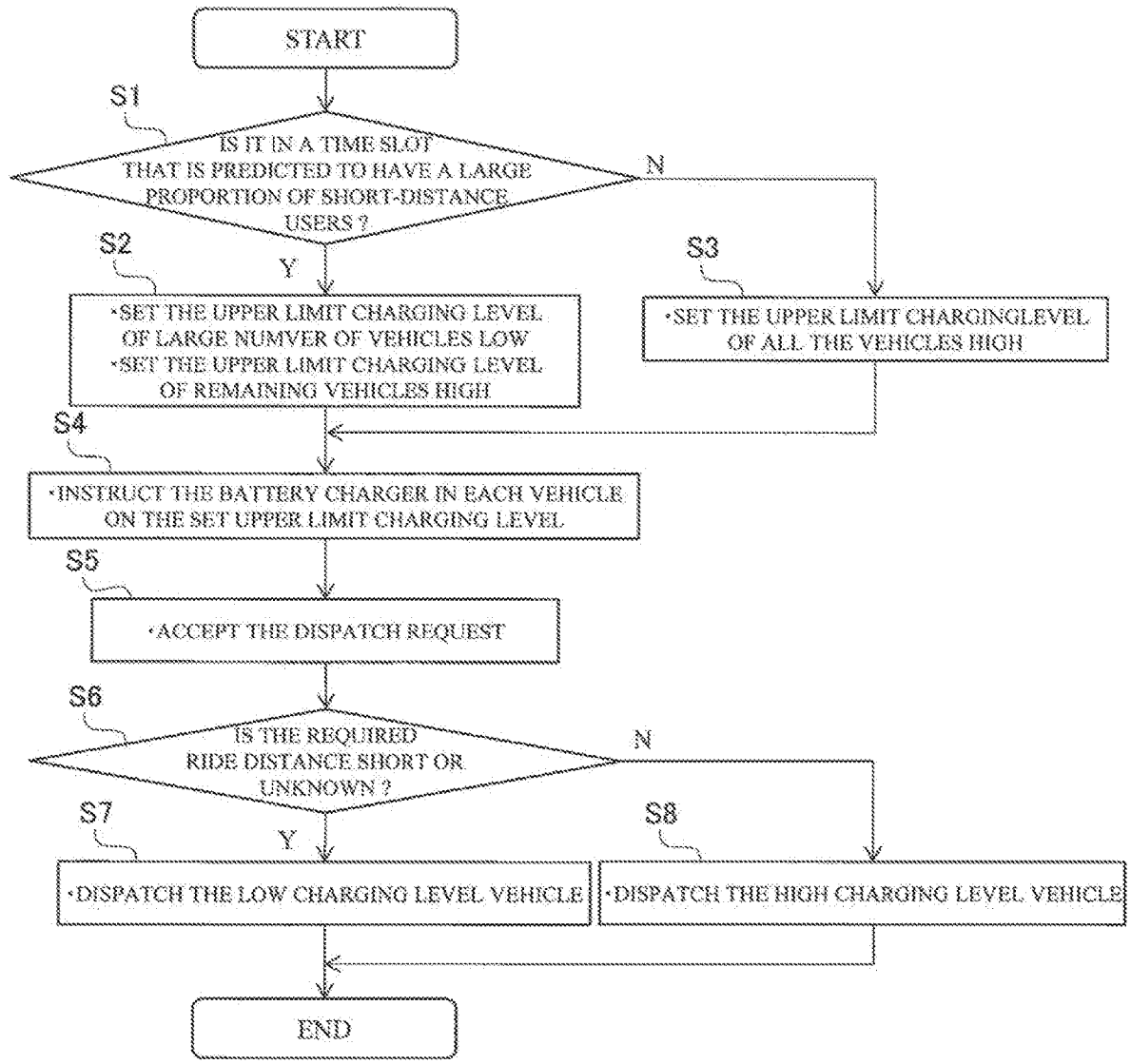
FIG. 6 is a flowchart illustrating processing by a management server according to the second embodiment.

The flow of the processing in the management server 20 according to the second embodiment can be represented using a flowchart shown in FIG. 6. This flowchart is also a flowchart indicating a vehicle dispatching method according to an embodiment of the present disclosure. According to the flowchart shown in FIG. 6, at first, the management server 20 determines whether the current time is within a time slot that is predicted to have a large proportion of short-distance users (step S1). When a determination result of step S1 is affirmative, the management server 20 sets the upper limit charging level of large number of vehicles 40 low and sets the upper limit charging level of remaining vehicles 40 high (step S2). On the other hand, when the determination result of step S1 is negative, the management server 20 sets the upper limit charging level of all the vehicles 40 high (step S3). Next, the management server 20 instructs the battery charger 45 in each vehicle 40 on the upper limit charging level set in step S2 or step S3 through the network 2 (step S4).

The management server 20 accepts the dispatch request from the user 30 (step S5). The management server 20 determines whether the information about the ride distance is included in the accepted dispatch request, and determines whether the ride distance that the user 30 requires is short if the information is included (step S6). When the ride distance that the user 30 requires is short or when the ride distance is unknown, the management server 20 dispatches the low charging level vehicle 40A to the user 30 (step S7). On the other hand, when the ride distance that the user 30 requires is long, the management server 20 dispatches the high charging level vehicle 40B to the user 30 (step S8).

3. Third Embodiment

The third embodiment is characterized by an organization of vehicles 40 used for the vehicle dispatching service. In the third embodiment, both the electric vehicle and the plug-in hybrid vehicle are incorporated into the organization, and are selectively used according to situations. The ratio of the number of electric vehicles and plug-in hybrid vehicles is not limited, but it is preferable that the number of electric vehicles is larger than the number of plug-in hybrid vehicles in terms of the energy cost.

In the third embodiment, a dispatching plan to make use of the above described organization is made by the vehicle dispatching planning unit 21. The charging plan made by charging planning unit 22 is similar to that of the first embodiment 1 as for the electric vehicle. That is, the upper limit charging level of the electric vehicle is lowered in a time slot that is predicted to have a large proportion of short-distance users, and is raised in a time slot that is predicted to have a large proportion of long-distance users. There is not a particular limitation as for the upper limit charging level of the plug-in hybrid vehicle.

Figure 7:
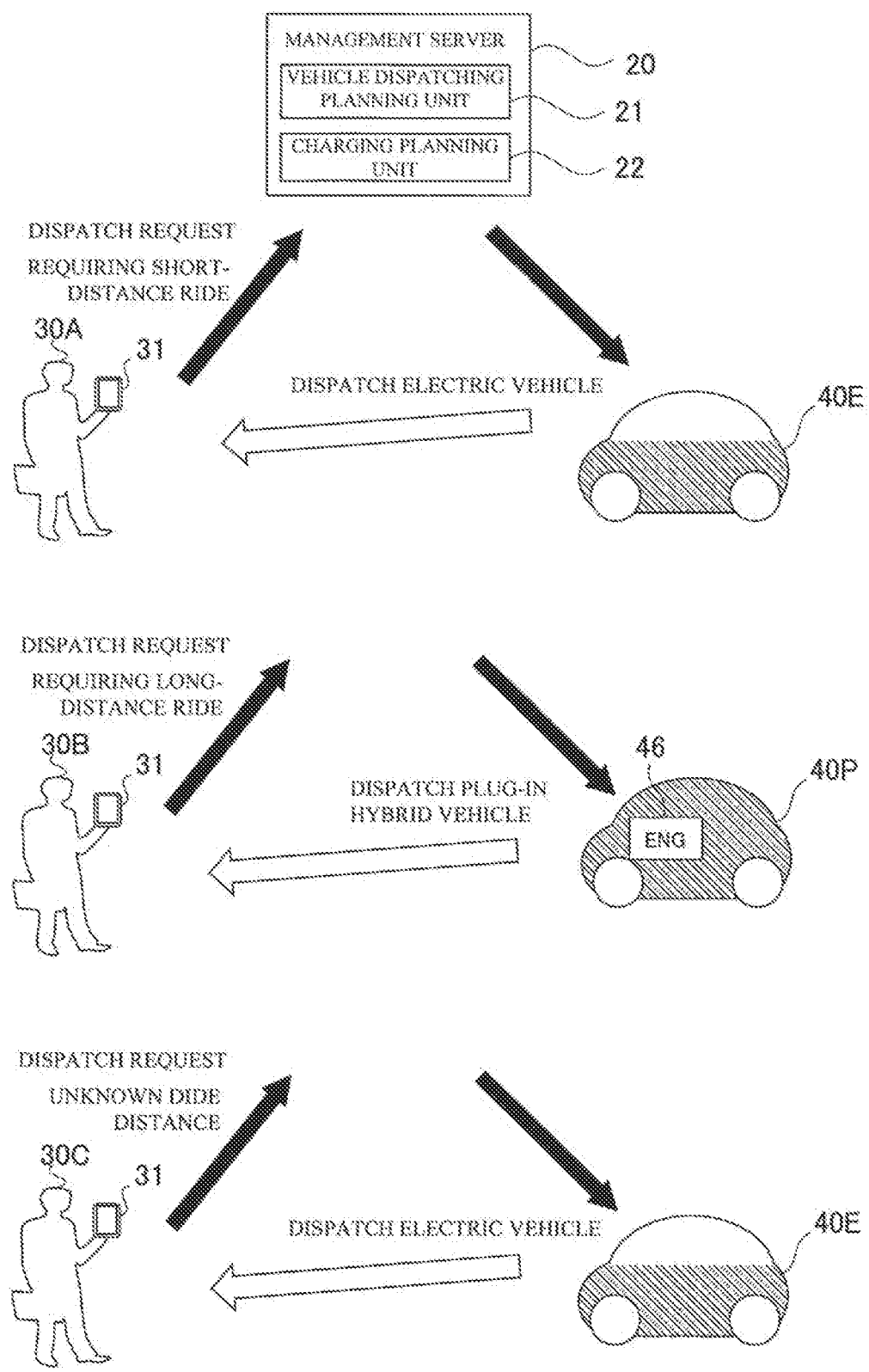
FIG. 7 is a view showing an overview of a dispatching plan according to a third embodiment.

FIG. 7 is a view showing an overview of the dispatching plan according to the third embodiment. As vehicles 40 used for the vehicle dispatching service, an electric vehicle (EV) 40E and a plug-in hybrid vehicle (PHV) 40P using an engine 46 as a power unit are prepared. In a time slot that is predicted to have a large proportion of short-distance users, the electric vehicle 40E is charged with a low upper limit charging level according to the charging plan. On the other hand, the plug-in hybrid vehicle 40P is charged with a high upper limit charging level because priority is given to a travelable distance. However, the plug-in hybrid vehicle 40P may be charged with a low upper limit charging level if priority is given to preventing deterioration of the battery 43.

The vehicle dispatching planning unit 21 determines which should be dispatched the electric vehicle 40E or the plug-in hybrid vehicle 40P according to the ride distance that a user 30A, 30B requires in a time slot that is predicted to have a large proportion of short-distance users. Specifically, the vehicle dispatching planning unit 21 compares a predetermined reference distance with the ride distance required by the user 30A, 30B. The vehicle dispatching planning unit 21 dispatches the electric vehicle 40E preferentially to the user 30A who requires a ride distance shorter than the reference distance, and dispatches the plug-in hybrid vehicle 40P to the user 30B who requires a ride distance equal to or longer than the reference distance. According to such a vehicle dispatching plan, a vehicle is dispatched that matches with both a demand from the company side to want to suppress the energy cost and a demand from the user 30A, 30B side about the ride distance.

Note that the number of available electric vehicles 40E may be insufficient with respect to the number of the dispatch requests requiring a short-distance ride. In such a case, the vehicle dispatching planning unit 21 dispatches the plug-in hybrid vehicle 40P to a user requiring a relatively long ride distance. On the contrary, the vehicle dispatching planning unit 21 dispatches the electric vehicle 40E to a user requiring a relatively short-distance ride when the number of plug-in hybrid vehicles 40P is insufficient with respect to the number of the dispatch requests requiring a long-distance ride.

The vehicle dispatching planning unit 21 dispatches the electric vehicle 40E to a user 30C of whom the dispatching request is unknown on a ride distance. According to such a use of the vehicle dispatching plan, it is unnecessary to prepare a lot of plug-in hybrid vehicles 40P, and makes it possible to suppress the energy cost.

Figure 8:
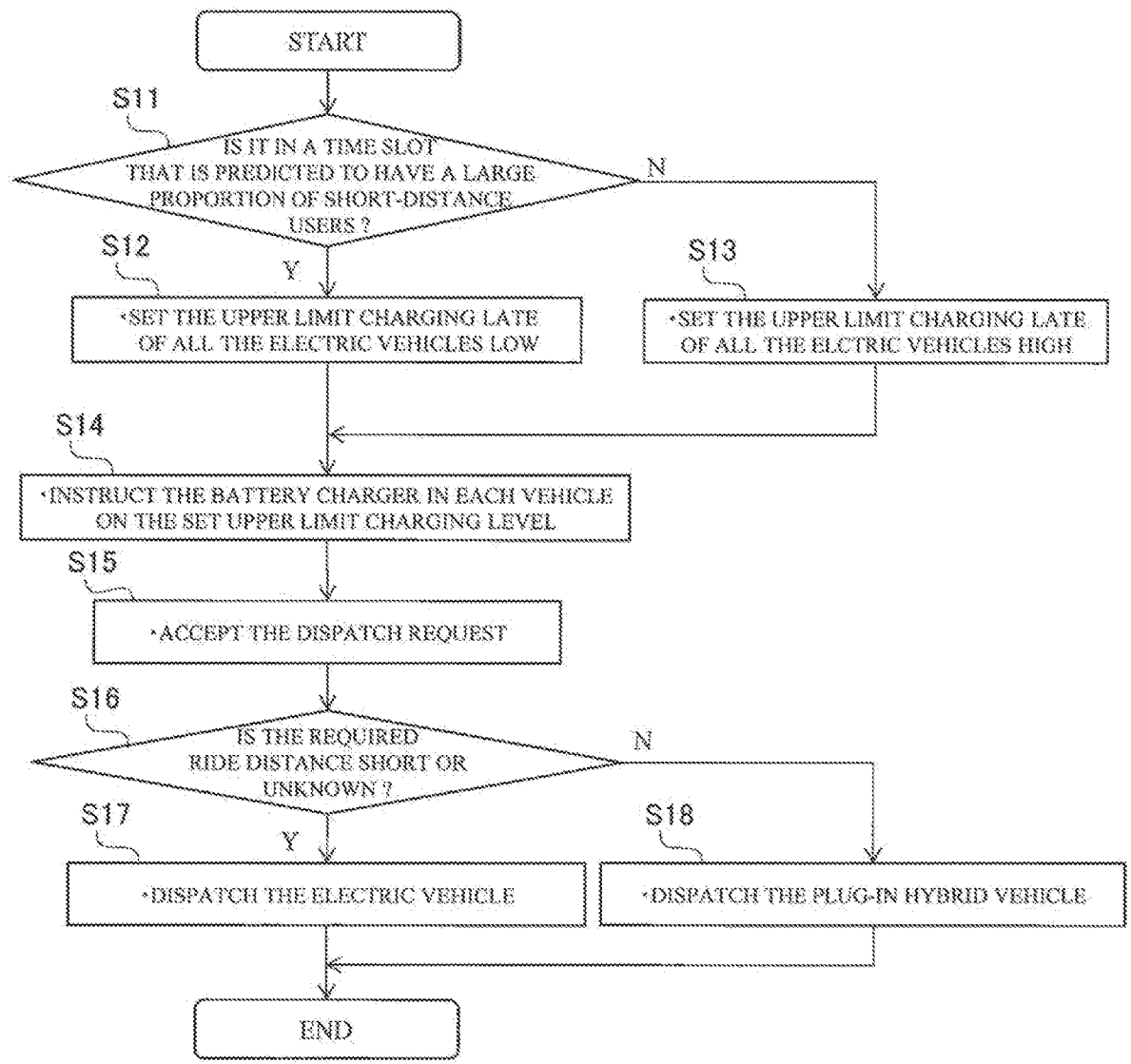
FIG. 8 is a flowchart illustrating processing by a management server according to the third embodiment.

The flow of the processing in the management server 20 according to the third embodiment can be represented using a flowchart shown in FIG. 8. According to this flowchart, at first, the management server 20 determines whether the current time is within a time slot that is predicted to have a large proportion of short-distance users (step S11). When a determination result of step S11 is affirmative, the management server 20 sets the upper limit charging level of all the electric vehicles 40E low (step S12). On the other hand, when the determination result of step S11 is negative, the management server 20 sets the upper limit charging level of all the electric vehicles 40E high (step S13). The upper limit charging level of the plug-in hybrid vehicle 40P is set high irrespective of a time slot. Next, the management server 20 instructs the battery charger 45 in each vehicle 40 on the upper limit charging level set in step S12 or step S13 through the network 2 (step S14).

The management server 20 accepts the dispatch request from the user 30 (step S15). The management server 20 determines whether the information about the ride distance is included in the accepted dispatch request, and determines whether the ride distance that the user 30 requires is short if the information is included (step S16). When the ride distance that the user 30 requires is short or when the ride distance is unknown, the management server 20 dispatches the electric vehicle 40E to the user 30 (step S17). On the other hand, when the ride distance that the user 30 requires is long, the management server 20 dispatches the plug-in hybrid vehicle 40P to the user 30 (step S18).

4. Fourth Embodiment

The fourth embodiment is characterized by a charging plan made by the charging planning unit 22 and an organization of vehicles 40 used for the vehicle dispatching service. In the fourth embodiment, both the electric vehicle and the plug-in hybrid vehicle are incorporated into the organization, and are selectively used according to situations. Furthermore, a charging plan similar to that of the second embodiment is adopted to the electric vehicle in the fourth embodiment. That is, as for a majority of electric vehicles used for the vehicle dispatching service, the upper limit charging level is lowered in a time slot that is predicted to have a large proportion of short-distance users, and is raised in a time slot that is predicted to have a large proportion of long-distance users. However, as for a minority of electric vehicles used for the vehicle dispatching service, the upper limit charging level is raised also in the time slot that is predicted to have a large proportion of short-distance users. There is not a particular limitation as for the upper limit charging level of the plug-in hybrid vehicle.

Figure 9:
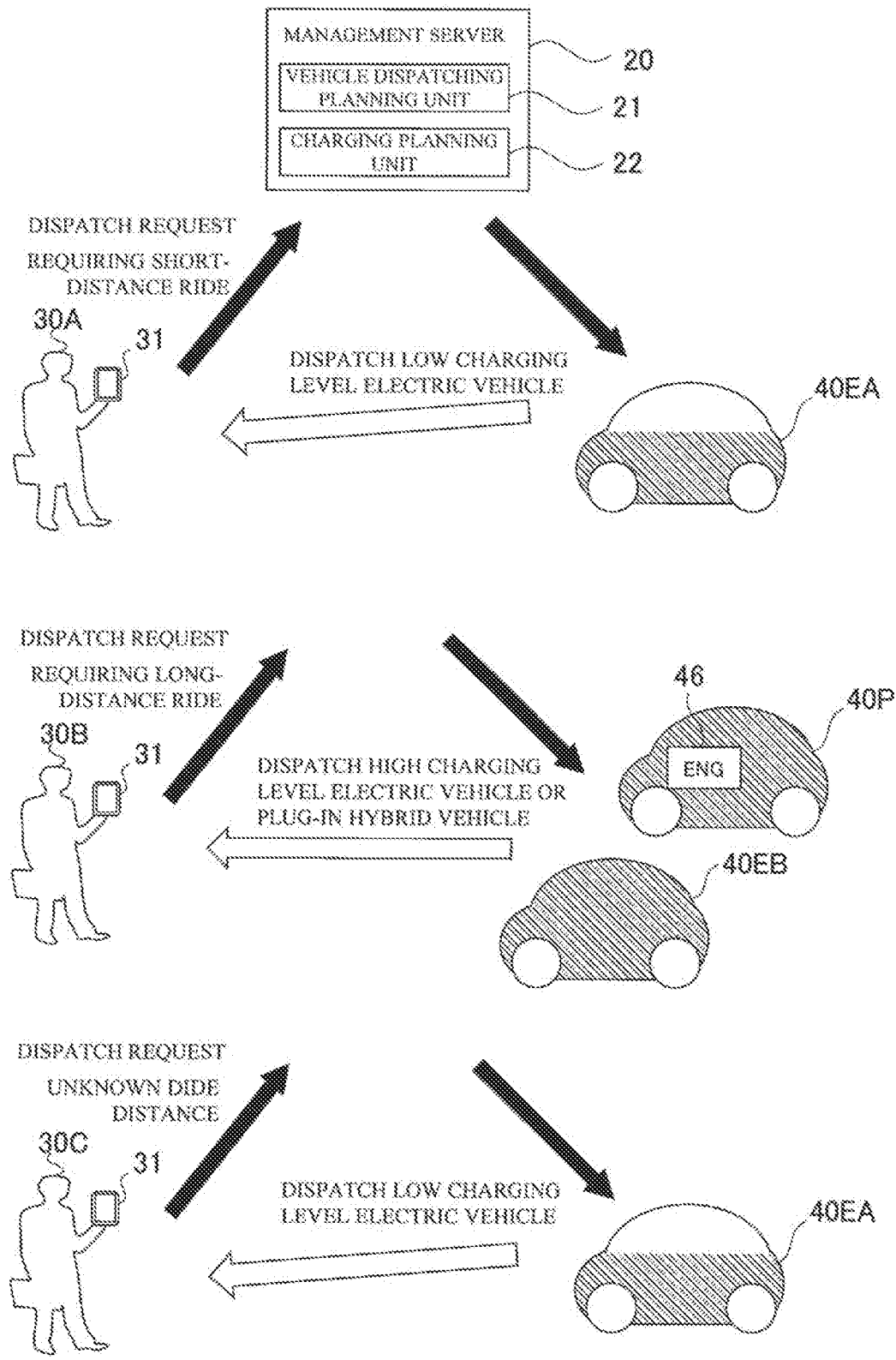
FIG. 9 is a view showing an overview of a dispatching plan according to a fourth embodiment.

FIG. 9 is a view showing an overview of the dispatching plan according to the fourth embodiment. In a time slot that is predicted to have a large proportion of short-distance users, a low charging level electric vehicle 40EA, a high charging level electric vehicle 40EB and a plug-in hybrid vehicle 40P are prepared. The plug-in hybrid vehicle 40P is charged with a high upper limit charging level because priority is given to a travelable distance. However, the plug-in hybrid vehicle 40P may be charged with a low upper limit charging level if priority is given to preventing deterioration of the battery 43.

The vehicle dispatching planning unit 21 compares a predetermined reference distance with the ride distance required by the user 30A, 30B. The vehicle dispatching planning unit 21 dispatches the low charging level electric vehicle 40EA preferentially to the user 30A who requires a ride distance shorter than the reference distance, and dispatches the high charging level electric vehicle 40EB or the plug-in hybrid vehicle 40P to the user 30B who requires a ride distance equal to or longer than the reference distance. According to such a vehicle dispatching plan, a vehicle is dispatched that matches with both a demand from the company side to want to raise the vehicle operation rate and suppress the energy cost and a demand from the user 30A, 30B side about the ride distance.

Which of the high charging level electric vehicle 40EB and the plug-in hybrid vehicle 40P is dispatched may be determined according to the ride distance required by the user 30B, for example. Specifically, the high charging level electric vehicle 40EB may be dispatched when the ride distance required by the user 30B is equal to or longer than the reference distance and is shorter than a second reference distance. Also, the plug-in hybrid vehicle 40P may be dispatched when the ride distance required by the user 30B is equal to or longer than the second reference distance. The second reference distance may be, for example, a distance that can be traveled using the battery 43 of the high charging level electric vehicle 40EB. According to such a vehicle dispatching plan, the electric vehicle 40EA, 40EB is used more preferentially than the plug-in hybrid vehicle 40P.

Note that the number of available low charging level electric vehicles 40EA may be insufficient with respect to the number of the dispatch requests requiring a short-distance ride. In such a case, the vehicle dispatching planning unit 21 dispatches the high charging level electric vehicle 40EB to a user requiring a relatively long ride distance. When the number of plug-in hybrid vehicles 40P and high charging level electric vehicles 40EB is insufficient with respect to the number of the dispatch requests requiring a long-distance ride, the vehicle dispatching planning unit 21 dispatches the low charging level electric vehicle 40EA to a user requiring a relatively short-distance ride.

The vehicle dispatching planning unit 21 dispatches the low charging level electric vehicle 40EA to a user 30C of whom the dispatching request is unknown on a ride distance. According to such a use of the vehicle dispatching plan, it is unnecessary to prepare a lot of high charging level electric vehicle 40EB and also a lot of plug-in hybrid vehicles 40P, and makes it possible to raise the vehicle operation rate and suppress the energy cost.

Figure 10:
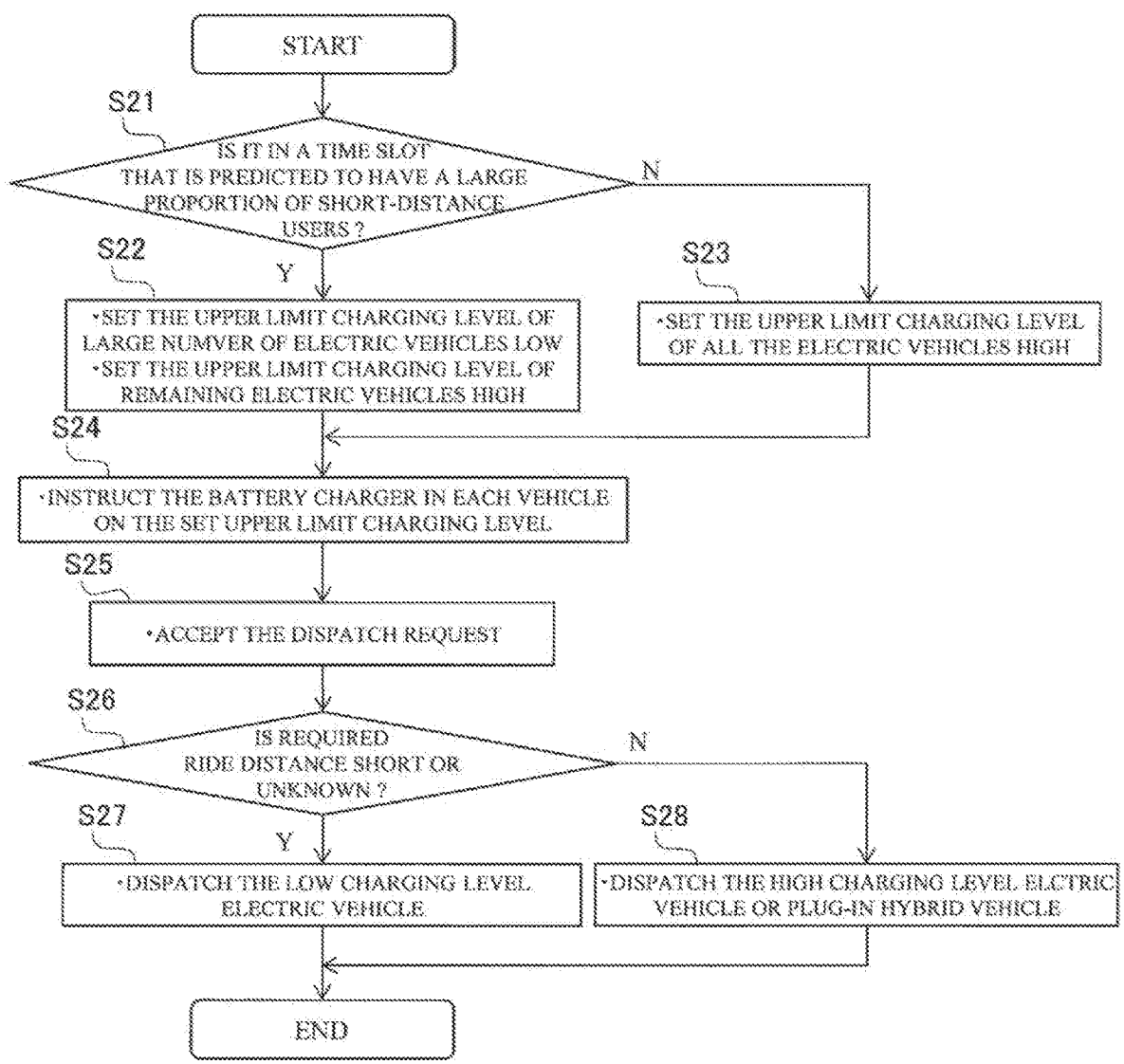
FIG. 10 is a flowchart illustrating processing by a management server according to the fourth embodiment.

The flow of the processing in the management server 20 according to the fourth embodiment can be represented using a flowchart shown in FIG. 10. According to this flowchart, at first, the management server 20 determines whether the current time is within a time slot that is predicted to have a large proportion of short-distance users (step S21). When a determination result of step S21 is affirmative, the management server 20 sets the upper limit charging level of large number of electric vehicles 40E low and sets the upper limit charging level of remaining electric vehicles 40E high (step S22). On the other hand, when the determination result of step S21 is negative, the management server 20 sets the upper limit charging level of all the electric vehicles 40E high (step S23). The upper limit charging level of the plug-in hybrid vehicle 40P is set high irrespective of a time slot. Next, the management server 20 provides the upper limit charging level set in step S22 or step S23 to the battery charger 45 in each vehicle 40 through the network 2 (step S24).

The management server 20 accepts the dispatch request from the user 30 (step S25). The management server 20 determines whether the information about the ride distance is included in the accepted dispatch request, and determines whether the ride distance that the user 30 requires is short if the information is included (step S26). When the ride distance that the user 30 requires is short or when the ride distance is unknown, the management server 20 dispatches the low charging level electric vehicle 40EA to the user 30 (step S27). On the other hand, when the ride distance that the user 30 requires is long, the management server 20 dispatches the high charging level electric vehicle 40EB or the plug-in hybrid vehicle 40P to the user 30 (step S28).

5. Fifth Embodiment

The fifth embodiment is characterized by proper use of charging methods used when the vehicle 40 is charged at the charging station 50. At the charging station 50, it is possible to perform the normal charging using the normal charging equipment 51 and the quick charging using the quick charging equipment 52. The quick charging requires less charging time than the normal charging, and thereby the operation rate of the vehicle 40 is raised by choosing the quick charging. On the other hand, charging efficiency of the quick charging is worse than that of the normal charging, and also the quick charging affects the life of the battery 43 adversely. In addition, the quick charging equipment 52 has a higher installation cost than the normal charging equipment 51.

In the fifth embodiment, the quick charging and the normal charging are used properly as follows in consideration of merits and demerits as above. The charging method used when the vehicle 40 is charged at the charging station 50 is provided to the vehicle 40 from the management server 20. The management server 20 usually directs the vehicle 40 to perform the normal charging as the charging method at the charging station 50. However, the management server 20 directs the vehicle 40 to perform the quick charging as the charging method at the charging station 50 when the number of available vehicles 40 is predicted to become insufficient due to increase in dispatch demand. That is, in the fifth embodiment, two charging methods are used properly depending on the dispatch demand. Thereby, deterioration of the battery 43 by the quick charging is prevented usually, and shortage of available vehicles 40 is prevented by permitting the quick charging when the dispatch demand is increased.

Figure 11:
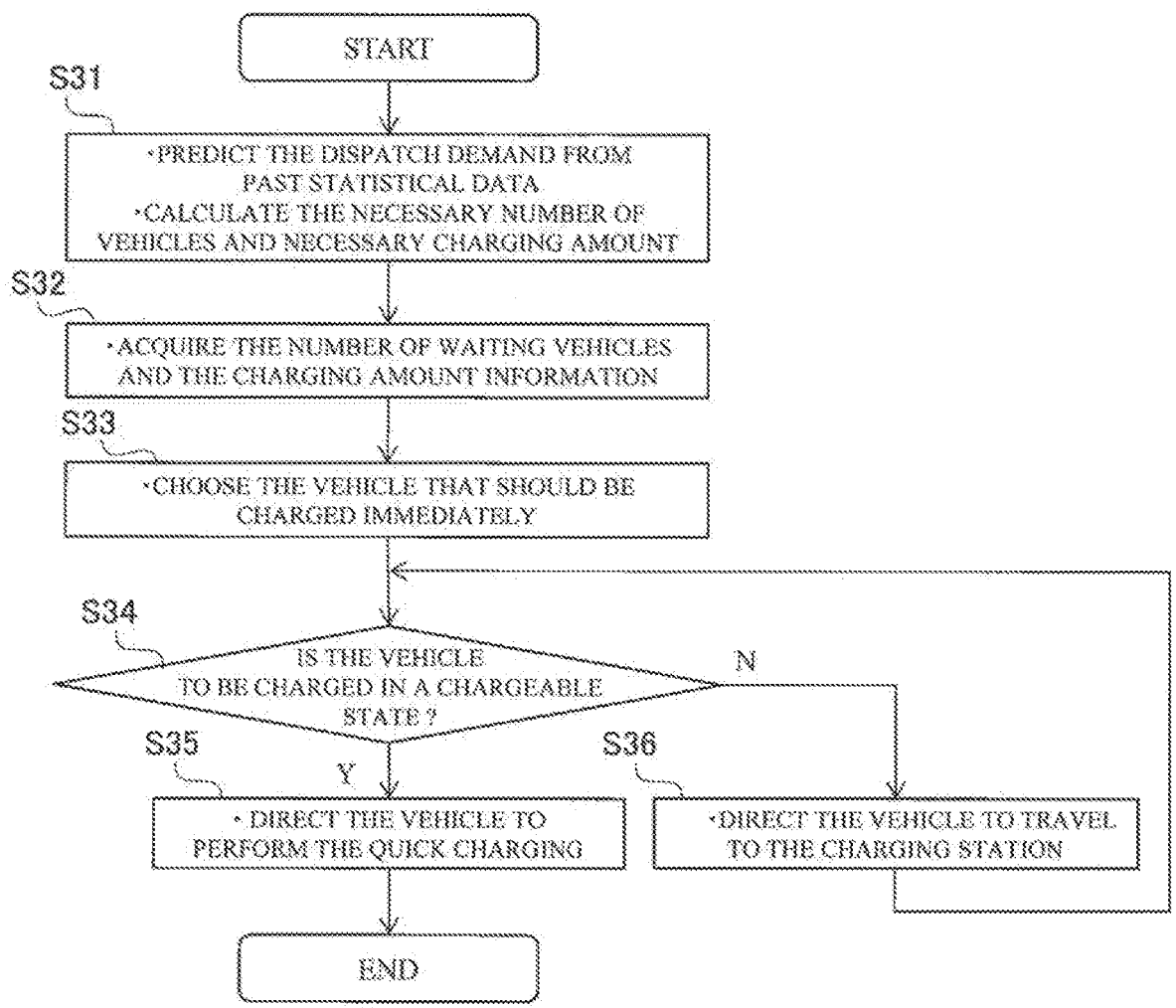
FIG. 11 is a flowchart illustrating processing by a management server according to a fifth embodiment.

The flow of the processing in the management server 20 according to the fifth embodiment can be represented using a flowchart shown in FIG. 11. According to this flowchart, at first, the management server 20 predicts the dispatch demand every fixed time from past statistical data, and calculates the necessary number of vehicles and necessary charging amount based on the predicted dispatch demand (step S31). Then, the management server 20 acquires the number of waiting vehicles 40 and information on the charging amount thereof (step S32). And, based on the necessary number of vehicles, the necessary charging amount, the number of waiting vehicles and total charging amount, the management server 20 chooses the vehicle 40 that should be charged immediately (step S33).

Then, the management server 20 determines whether the vehicle 40 to be charged is in a state rechargeable immediately, more specifically, whether the vehicle 40 is in the charging station 50 equipped with the quick charging equipment 52 (step S34). When the vehicle 40 to be charged is in a rechargeable state, the management server 20 directs the vehicle 40 to perform the quick charging (step S35). When the vehicle 40 to be charged is not in a rechargeable state, the management server 20 directs the vehicle 40 to move to the charging station 50 equipped with the quick charging equipment 52 (step S36).

Note that the proper use of charging methods described above can be applied to the vehicle dispatching system of any one of the first to fourth embodiments. However, when the vehicles 40 used for the vehicle dispatching service are organized only with plug-in hybrid vehicles, the quick charging is unnecessary because the plug-in hybrid can travel using an energy source other than a battery. Also, when the vehicles 40 used for the vehicle dispatching service are organized with both electric vehicles and plug-in hybrid vehicles, the quick charging may be performed only to the electric vehicle.

6. Sixth Embodiment

The sixth embodiment is characterized by using the quick charging as an emergency charging method. The management server 20 usually directs the vehicle 40 to perform the normal charging as the charging method at the charging station 50. However, when the vehicle 40 that is carrying a user seems not to be able to travel a necessary distance due to the battery shortage, the management server 20 moves the vehicle 40 to the charging station 50 equipped with the quick charging equipment 52 and directs the vehicle 40 to perform the quick charging. After completion of the quick charging, the management server 20 directs the vehicle 40 to resume autonomous traveling to the destination. By proper use of these two charging methods, deterioration of the battery 43 by the quick charging is prevented usually, and occurrence of a situation where the vehicle 40 carrying a user becomes unable to travel due to the battery shortage is prevented by permitting the quick charging in case of emergency.

Figure 12:
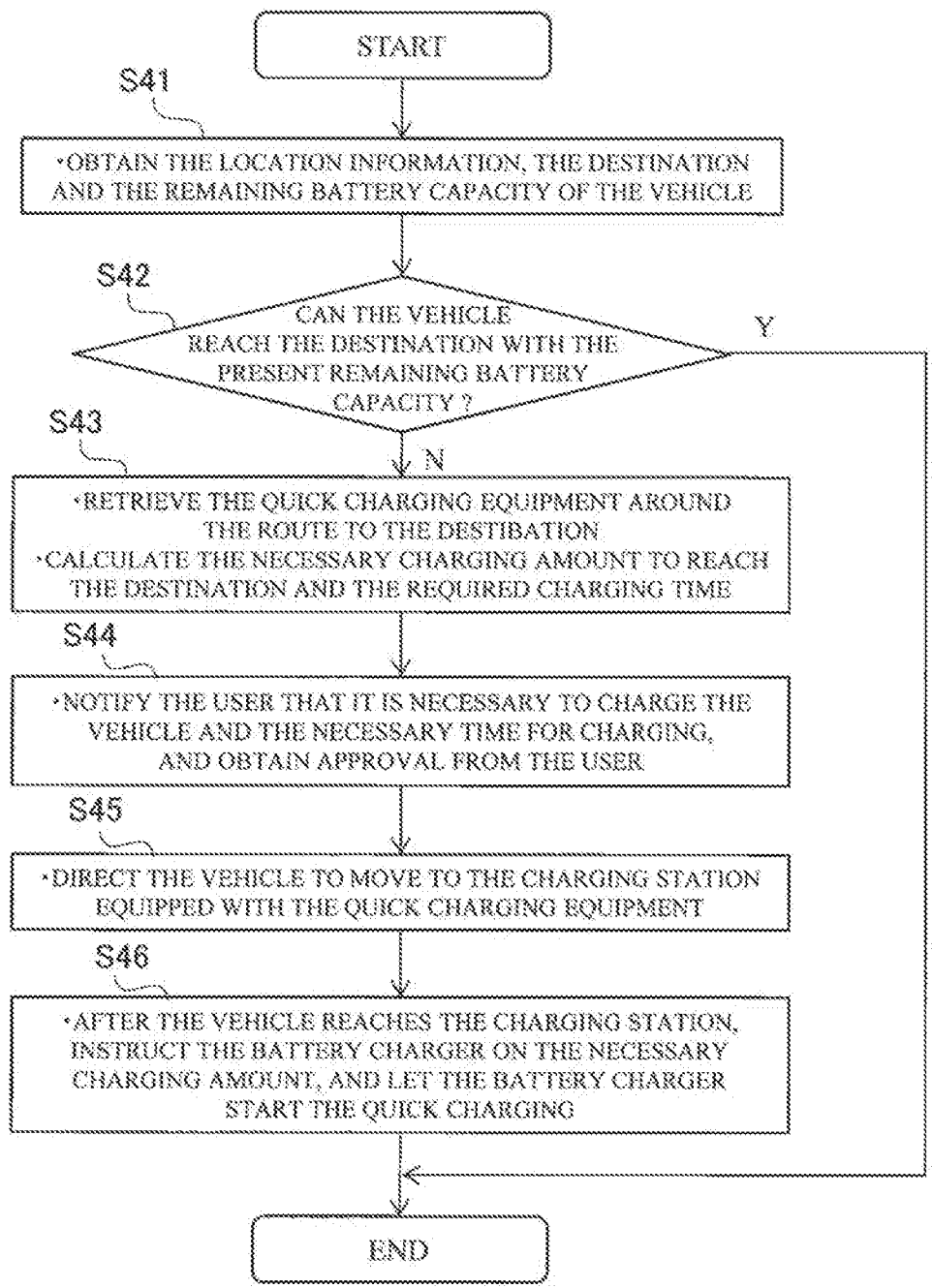
FIG. 12 is a flowchart illustrating processing by a management server according to a sixth embodiment.

The flow of the processing in the management server 20 according to the sixth embodiment can be represented using a flowchart shown in FIG. 12. According to this flowchart, at first, the management server 20 obtains information about the present location of the vehicle 40, the destination and the present remaining battery capacity of the vehicle 40 (step S41). Then, the management server 20 determines whether the vehicle 40 can arrive at the destination with the present remaining battery capacity based on the power consumption rate of the vehicle 40 (step S42). The power consumption rate of the vehicle 40 may be a catalog value or may be a calculated value obtained from the past power consumption amount and the traveling distance. When a determination result in step S42 is affirmative, there is no need for charging the vehicle 40, so that the remaining steps S43 to S46 are skipped.

When the determination result in step S42 is negative, performing charging with respect to the vehicle 40 is required. In this case, the management server 20 retrieves the quick charging equipment 52 around the route to the destination, and calculates the necessary charging amount to arrive at the destination and the time required for charging the necessary charging amount (step S43). Then, the management server 20 notifies the user 30 on the vehicle 40 that it is necessary to charge the vehicle 40 and the necessary time for charging, and obtains from the user 30 approval to drop in at the charging station 50 for charging (step S44). If the approval is obtained from the user 30, the management server 20 directs the vehicle 40 to move to the charging station 50 equipped with the quick charging equipment 52 (step S45). After the vehicle 40 arrives at the charging station 50, the management server 20 instructs the battery charger 45 in the vehicle 40 on the necessary charging amount, and lets the battery charger 45 start the quick charging (step S46).

Note that the use of the quick charging in case of emergency described above can be applied to the vehicle dispatching system of any one of the first to fifth embodiments. However, when the vehicles 40 used for the vehicle dispatching service are organized only with plug-in hybrid vehicles, the quick charging is unnecessary because the plug-in hybrid can travel using an energy source other than a battery. Also, when the vehicles 40 used for the vehicle dispatching service are organized with both electric vehicles and plug-in hybrid vehicles, the quick charging may be performed only to the electric vehicle.

What is claimed is:

1. A vehicle dispatching system that accepts a dispatch request from a user, selects an autonomous vehicle matching with the dispatch request from among a plurality of autonomous vehicles, and dispatches a selected autonomous vehicle to the user, wherein
   the plurality of autonomous vehicles include a plurality of battery-mounted vehicles having an in-vehicle battery capable of being charged externally as an energy source;
   each of the plurality of battery-mounted vehicles performs charging at a charging station when a charging level of the in-vehicle battery decreases; and
   the vehicle dispatching system comprises a management server including a processor for executing programs stored in memory, the management server programmed to act as a charging planning unit that changes an upper limit charging level of the in-vehicle battery when charging at the charging station according to a time slot,
   wherein the plurality of battery-mounted vehicles include electric vehicles having the in-vehicle battery as an only energy source and plug-in hybrid vehicles having the in-vehicle battery and an energy source other than the in-vehicle battery; and
   wherein the management server is programmed to further act as a dispatching planning unit that dispatches an electric vehicle preferentially to a short-distance user, and dispatches a plug-in hybrid vehicle to a long-distance user, in a time slot that is predicted to have a large proportion of short-distance users, when ride distance information is included in the dispatch request.

2. The vehicle dispatching system according to claim 1, wherein the charging planning unit lowers the upper limit charging level in the time slot that is predicted to have a large proportion of short-distance users, and raises the upper limit charging level in a time slot that is predicted to have a large proportion of long-distance users.

3. The vehicle dispatching system according to claim 2, wherein the charging planning unit raises the upper limit charging level of a part of the plurality of battery-mounted vehicles in the time slot that is predicted to have a large proportion of long-distance users.

4. The vehicle dispatching system according to claim 3, wherein the management server is programmed to further act as the dispatching planning unit that dispatches a battery-mounted vehicle charged with a low upper limit charging level preferentially to a short-distance user, and dispatches a battery-mounted vehicle charged with a high upper limit charging level to a long-distance user, in the time slot that is predicted to have a large proportion of short-distance users, when ride distance information is included in the dispatch request.

5. The vehicle dispatching system according to claim 4, wherein the dispatching planning unit dispatches a battery-mounted vehicle charged with a low upper limit charging level in the time slot that is predicted to have a large proportion of short-distance users, when the ride distance information is not included in the dispatch request.

6. The vehicle dispatching system according to claim 3, wherein the management server is programmed to further act as the dispatching planning unit that dispatches an electric vehicle charged with a low upper limit charging level preferentially to a short-distance user, and dispatches an electric vehicle charged with a high upper limit charging level or a plug-in hybrid vehicle to a long-distance user, in the time slot that is predicted to have a large proportion of short-distance users, when ride distance information is included in the dispatch request.

7. The vehicle dispatching system according to claim 6, wherein the dispatching planning unit dispatches an electric vehicle charged with a high upper limit charging level preferentially to a long-distance user when a ride distance of the user is shorter than a travelable distance by the in-vehicle battery, and dispatches a plug-in hybrid vehicle to the long-distance user when the ride distance of the user is longer than the travelable distance by the in-vehicle battery.

8. The vehicle dispatching system according to claim 6, wherein the dispatching planning unit dispatches an electric vehicle charged with a low upper limit charging level in the time slot that is predicted to have a large proportion of short-distance users, when the ride distance information is not included in the dispatch request.

9. The vehicle dispatching system according to claim 1, wherein the dispatching planning unit dispatches an electric vehicle in the time slot that is predicted to have a large proportion of short-distance users, when the ride distance information is not included in the dispatch request.

10. The vehicle dispatching system according to claim 1, wherein the vehicle dispatching system usually directs the battery-mounted vehicles to perform normal charging at the charging station, and, when the number of available battery-mounted vehicles is predicted to become insufficient due to increase in dispatch demand, directs the battery-mounted vehicles to perform quick charging at the charging station.

11. The vehicle dispatching system according to claim 1, wherein the vehicle dispatching system usually directs the battery-mounted vehicles to perform normal charging at the charging station, and, when a battery-mounted vehicle carrying a user seems not to be able to travel a necessary distance due to the battery shortage, moves the battery-mounted vehicle carrying a user to the charging station and directs the battery-mounted vehicle carrying a user to perform quick charging.

12. A vehicle dispatching method that accepts a dispatch request from a user, selects an autonomous vehicle matching with the dispatch request from among a plurality of autonomous vehicles, and dispatches a selected autonomous vehicle to the user, the vehicle dispatching method comprising:
preparing, as a part of the plurality of autonomous vehicles, a plurality of battery-mounted vehicles having an in-vehicle battery capable of being charged externally as an energy source;
performing charging with respect to each of the plurality of battery-mounted vehicles at a charging station when a charging level of the in-vehicle battery decreases;
changing an upper limit charging level of the in-vehicle battery when charging at the charging station according to a time slot,
wherein the plurality of battery-mounted vehicles include electric vehicles having the in-vehicle battery as an only energy source and plug-in hybrid vehicles having the in-vehicle battery and an energy source other than the in-vehicle battery; and
dispatching an electric vehicle preferentially to a short-distance user, and dispatching a plug-in hybrid vehicle to a long-distance user, in a time slot that is predicted to have a large proportion of short-distance users, when ride distance information is included in the dispatch request.

13. The vehicle dispatching method according to claim 12, wherein the upper limit charging level is lowered in a time slot that is predicted to have a large proportion of short-distance users, and is raised in a time slot that is predicted to have a large proportion of long-distance users.

14. The vehicle dispatching method according to claim 13, wherein the upper limit charging level of a part of the plurality of battery-mounted vehicles is raised in the time slot that is predicted to have a large proportion of long-distance users.

* * * * *